(12) United States Patent
Moon et al.

(10) Patent No.: US 11,279,236 B2
(45) Date of Patent: Mar. 22, 2022

(54) BRAKING CONTROL SYSTEM AND METHOD FOR VEHICLE

(71) Applicants: Hyundai Motor Company, Seoul (KR); Kia Motors Corporation, Seoul (KR)

(72) Inventors: Hyo Sik Moon, Gyeonggi-do (KR); Jae Hoon Choi, Gyeonggi-do (KR); Hee Sung Moon, Seoul (KR); Yun Ho Kim, Seoul (KR); Sung Keun Song, Gyeongsangnam-do (KR); Kyung In Min, Gyeonggi-do (KR); Yu Seok Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 198 days.

(21) Appl. No.: 16/590,004

(22) Filed: Oct. 1, 2019

(65) Prior Publication Data
US 2020/0369156 A1 Nov. 26, 2020

(30) Foreign Application Priority Data
May 20, 2019 (KR) .......................... 10-2019-0058677

(51) Int. Cl.
*B60L 7/18* (2006.01)
*B60L 7/14* (2006.01)
*B60L 7/26* (2006.01)

(52) U.S. Cl.
CPC ........ *B60L 7/18* (2013.01); *B60L 7/14* (2013.01); *B60L 7/26* (2013.01)

(58) Field of Classification Search
CPC ...... B60L 7/18; B60L 7/14; B60L 7/26; B60L 7/22; B60L 7/24; B60L 7/10; B60L 7/00
See application file for complete search history.

(56) References Cited

U.S. PATENT DOCUMENTS

| | | | | |
|---|---|---|---|---|
| 2002/0063000 A1* | 5/2002 | Kojima | ................. | B60K 6/543 180/65.1 |
| 2015/0291040 A1* | 10/2015 | Park | ..................... | B60W 20/50 290/9 |

(Continued)

FOREIGN PATENT DOCUMENTS

| | | |
|---|---|---|
| KR | 101371898 B1 | 3/2014 |
| KR | 101876881 B1 | 7/2018 |

*Primary Examiner* — James J Lee
*Assistant Examiner* — Steven Vu Nguyen
(74) *Attorney, Agent, or Firm* — Mintz Levin Cohn Ferris Glovsky and Popeo, P.C.; Peter F. Corless

(57) ABSTRACT

A braking control system for a vehicle is provided. The system includes a motor providing rotational force to wheels of the vehicle and a first battery storing electric energy for driving the motor. An inverter is connected to the first battery via a DC link terminal and performs a bidirectional power conversion between the DC link terminal and the motor. A DC converter is connected to the DC link terminal to down-convert a voltage of the DC link terminal and output the down-converted voltage. A second battery is supplied with the voltage converted by the DC converter and has a voltage lower than that of the first battery. A controller operates the inverter and the DC converter to charge regenerative braking energy generated from the motor during braking of the vehicle in the first battery and the second battery.

12 Claims, 4 Drawing Sheets

(56) References Cited

U.S. PATENT DOCUMENTS

| | | | |
|---|---|---|---|
| 2016/0105132 A1* | 4/2016 | Kim | B60L 50/51 |
| | | | 701/22 |
| 2017/0057363 A1* | 3/2017 | Huh | B60L 50/40 |
| 2018/0056790 A1* | 3/2018 | Symanow | B60K 6/448 |
| 2018/0233943 A1* | 8/2018 | Koizumi | H02J 7/1423 |
| 2019/0229540 A1* | 7/2019 | Lee | H02J 7/0024 |

* cited by examiner

BRAKING CONTROL SYSTEM AND METHOD FOR VEHICLE

CROSS REFERENCE TO RELATED APPLICATION

The present application claims priority to Korean Patent Application No. 10-2019-0058677, filed May 20, 2019, the entire contents of which is incorporated herein for all purposes by this reference.

BACKGROUND

1. Technical Field

The present disclosure relates to a braking control system and method for a vehicle, and more particularly, to a braking control system and method for a vehicle that improve fuel efficiency of the vehicle by determining regenerative braking torque of the vehicle using both a main battery and an auxiliary battery provided in an eco-friendly vehicle.

2. Description of the Related Art

As the problems of global warming and environmental pollution increase, research and development of eco-friendly vehicles that may reduce environmental pollution in an automobile industry are being actively conducted, and a market thereof is also gradually expanding. Many eco-friendly vehicles use motors that generate driving power using electric energy instead of engines that generate driving power by burning conventional fossil fuels, and electric vehicles, hybrid vehicles, plug-in hybrid vehicles, hydrogen battery vehicles, and the like are being commercialized.

Such eco-friendly vehicles include a high-voltage main battery for storing electric energy for driving the motor and a low-voltage auxiliary battery for storing electric energy for providing power supply to electric components of the vehicle. Meanwhile, the eco-friendly vehicle is applied with a regenerative braking technology for producing electric energy for charging the main battery while providing braking torque to the vehicle by operating a motor for driving wheels of the vehicle as a generator when braking of the vehicle to generate electric power.

Conventionally, a total braking torque desired by a driver is generated by summing the braking torque by a hydraulic brake operating by receiving hydraulic pressure when braking of the vehicle and the braking torque by the regenerative braking of the motor. In particular, the braking torque by the regenerative braking is determined based on a chargeable capacity of the main battery to be charged by receiving the power generated by the motor. Such a conventional providing method has a limitation on the regenerative braking torque since the regenerative braking torque is determined based only on the chargeable capacity of the main battery. In addition, according to a conventional braking method, when a depressed amount of a brake pedal remains constant, the braking torque by the hydraulic brake should be additionally increased if the regenerative braking torque is reduced, and accordingly, there is a need for a separate auxiliary apparatus.

The contents described as the related art have been provided merely to assist in understanding the background of the present disclosure and should not be considered as corresponding to the related art known to those having ordinary skill in the art.

SUMMARY

An object of the present disclosure is to provide a braking control system and method for a vehicle that may increase a regenerative braking torque during braking of the vehicle and may maintain a required braking torque constant without a separate brake assist apparatus for increasing a braking torque of a hydraulic brake when a constant braking torque is continuously required.

According to an exemplary embodiment of the present disclosure, a braking control system for a vehicle may include: a motor providing rotational force to wheels of the vehicle; a first battery storing electric energy for driving the motor; an inverter connected to the first battery via a direct current (DC) link terminal and configured to perform a bidirectional power conversion between the DC link terminal and the motor; a direct current (DC) converter connected to the DC link terminal to down-convert a voltage of the DC link terminal and output the down-converted voltage; a second battery supplied with the voltage converted by the DC converter and having a voltage less than that of the first battery; and a controller configured to operate the inverter and the DC converter to charge regenerative braking energy generated from the motor during braking of the vehicle in the first battery and the second battery.

The controller may be configured to calculate a chargeable energy amount of both the first battery and the second battery based on a state of charge of the first battery and the second battery during braking of the vehicle, determine an execution regenerative braking torque which is output from the motor based on the chargeable energy amount, and operate the inverter for the motor to output the execution regenerative braking torque. The controller may also be configured to calculate a required braking torque based on a depressed amount of a brake pedal of the vehicle, calculate the maximum possible regenerative braking torque, which is the maximum value of the regenerative braking torque which is provided to the motor, based on the required braking torque, predict a braking time based on the required braking torque and driving information of the vehicle, calculate the maximum allowable regenerative braking torque, which is the maximum value of the allowable regenerative braking torque, based on the chargeable energy amount and the predicted braking time, and determine a smaller torque of the maximum possible regenerative braking torque and the maximum allowable regenerative braking torque as the execution regenerative braking torque.

When the controller operates the inverter to output the execution regenerative braking torque, the controller may be configured to operate the inverter to adjust an output voltage of the DC link terminal side of the inverter to become greater than a voltage of the first battery, and simultaneously operate the DC converter to adjust an output of the DC converter to become greater than a voltage of the second battery. When the controller operates the inverters to output the execution regenerative braking torque, the controller may be configured to operate the DC converter to output a voltage less than a voltage of the second battery or stop an operation of the DC converter while operating the inverter to adjust an output voltage of the DC link terminal side of the inverter to become greater than a voltage of the first voltage, and operate the DC converter to output a voltage greater than the voltage of the second battery while operating the inverter to output a voltage less than the voltage of the first battery when the state of charge of the first battery becomes a fully charged state.

When the controller operates the inverters to output the execution regenerative braking torque, the controller may be configured to operate the DC converter to output a voltage less than a voltage of the second battery or stop an operation of the DC converter while operating the inverter to adjust an output voltage of the DC link terminal side of the inverter to become greater than a voltage of the first voltage, and operate the DC converter to output a voltage greater than the voltage of the second battery while operating the inverter to output a voltage greater than the voltage of the first battery when the magnitude of a current provided to the first battery is decreased by a predetermined level or more.

According to another exemplary embodiment of the present disclosure, a braking control method for a vehicle using the braking control system for a vehicle described above may include: calculating a required braking torque when a braking of the vehicle is started; calculating a chargeable energy amount of both the first battery and the second battery based on a state of charge of the first battery and the second battery; and determining an execution regenerative braking torque which is output from the motor based on the chargeable energy amount and operating the inverter to generated the execution regenerative braking torque.

The braking control method for a vehicle may further include: calculating the maximum possible regenerative braking torque, which is the maximum value of a regenerative braking torque which is provided to the motor, based on the required braking torque; predicting a braking time based on the required braking torque and driving information of the vehicle; and calculating the maximum allowable regenerative braking torque, which is the maximum value of an allowable regenerative braking torque, based on the chargeable energy amount and the predicted braking time. In the operating of the inverter, a smaller torque of the maximum possible regenerative braking torque and the maximum allowable regenerative braking torque may be determined as the execution regenerative braking torque and the inverter may be operated to generate the execution regenerative braking torque.

In the operating of the inverter, the first battery and the second battery may be simultaneously charged using the regenerative braking energy generated by the execution regenerative braking torque. In addition, the inverter may be operated to adjust an output voltage of the DC link terminal side of the inverter to become greater than a voltage of the first battery, and the DC converter may be operated to adjust an output of the DC converter to become greater than a voltage of the second battery.

In the operating of the inverter, the second battery may be charged after the first battery is fully charged using the regenerative braking energy generated by the execution regenerative braking torque. In addition, the DC converter may be operated to output a voltage less than a voltage of the second battery or an operation of the DC converter may be stopped while the inverter is operated to adjust an output voltage of the DC link terminal side of the inverter to become greater than a voltage of the first voltage, and the DC converter may be operated to output a voltage greater than the voltage of the second battery while the inverter is operated to output a voltage less than the voltage of the first battery when the state of charge of the first battery becomes a fully charged state.

In the operating of the inverter, the first battery may be first charged using the regenerative braking energy generated by the execution regenerative braking torque, and the first battery and the second battery may be simultaneously charged using the regenerative braking energy generated by the execution regenerative braking torque when the regenerative braking energy provided to the first battery is decreased during charging of the first battery. In addition, the DC converter may be operated to output a voltage less than a voltage of the second battery or an operation of the DC converter may be stopped while the inverter is operated to adjust an output voltage of the DC link terminal side of the inverter to become greater than a voltage of the first voltage, and the DC converter may be operated to output a voltage greater than the voltage of the second battery while the inverter is operated to output a voltage greater than the voltage of the first battery when the magnitude of a current provided to the first battery is decreased by a predetermined level or more.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a braking control system and method for a vehicle according to various exemplary embodiments of the present disclosure will be described in more detail with reference to the accompanying drawings.

Figure 1:
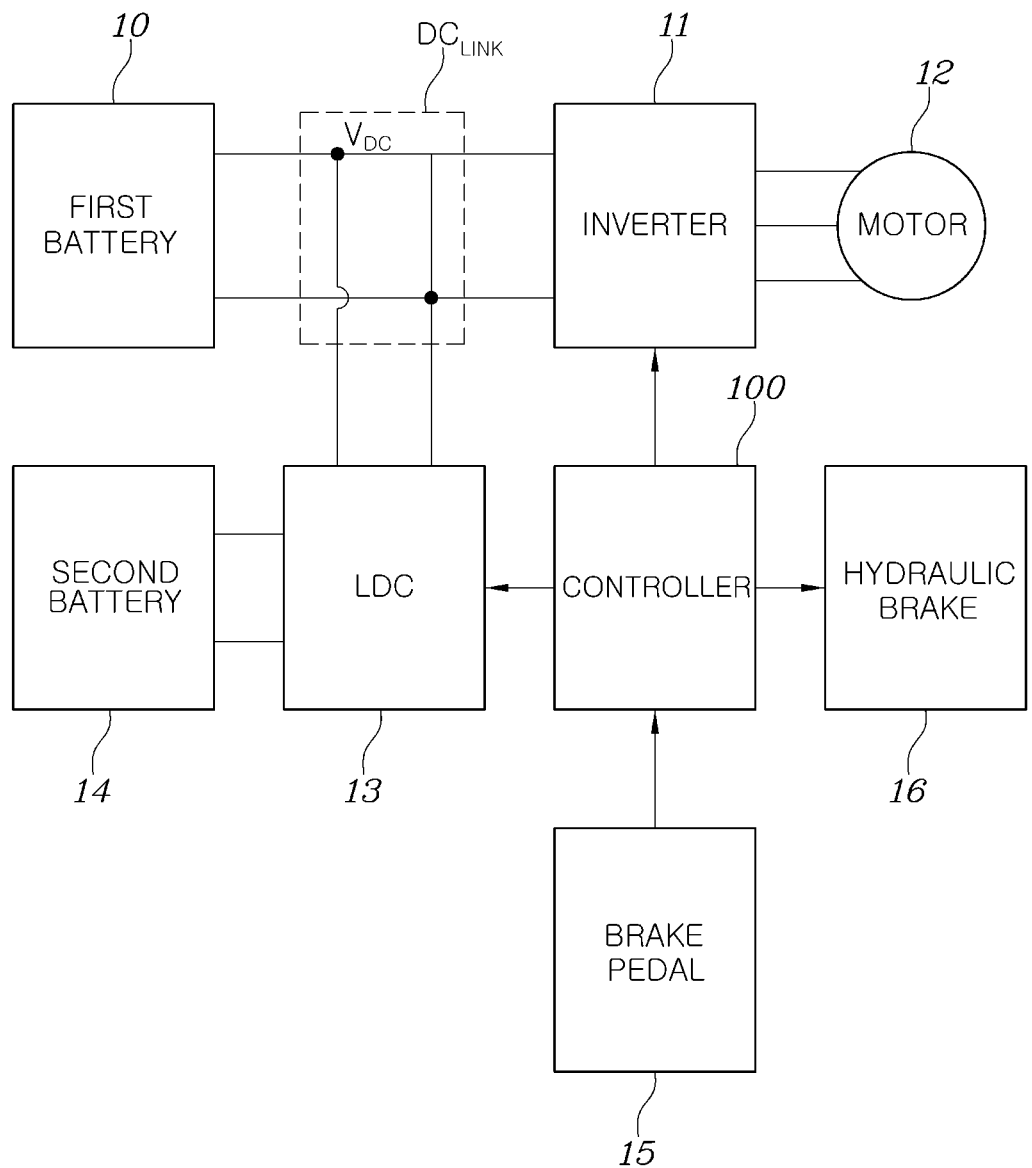
FIG. 1 is a block diagram illustrating a braking control system for a vehicle according to an exemplary embodiment of the present disclosure.

FIG. 1 is a block diagram of a braking control system for a vehicle according to an exemplary embodiment of the present disclosure. Referring to FIG. 1, a braking control system for a vehicle according to an exemplary embodiment of the present disclosure may include a motor 12 providing rotational force to wheels of the vehicle, a first battery 10 storing electric energy for driving the motor 12, an inverter 11 connected to the first battery 10 through a direct current (DC) link terminal $DC_{LINK}$ and configured to perform a bidirectional power conversion between the DC link terminal $DC_{LINK}$ and the motor 12, a direct current (DC) converter 13 connected to the DC link terminal $DC_{LINK}$ to down-convert a voltage $V_{DC}$ of the DC link terminal and output the down-converted voltage, a second battery 14 supplied with the voltage converted by the DC converter 13 and having a voltage that is less than that of the first battery 10, and a controller 100 configured to operate the inverter 11 and the DC converter 13 to charge regenerative braking energy generated from the motor 12 during braking of the vehicle in the first battery 10 and the second battery 14.

The motor 12 may be configured to convert electric energy into kinetic energy or kinetic energy into electric energy. The motor 12 may be configured to generate a rotational force using a change in a magnetic field generated by an alternating current of a plurality of phases injected from the inverter 11 and flowing to a core, and on the contrary, may also provide a current that is induced in the core passing through the magnetic field to the inverter 11. The first battery 10 may be configured to store the electric energy supplied to the motor 12 providing the rotational force to wheels of the vehicle to allow the vehicle to drive. The first battery 10 may have a relatively high voltage specification in view of the fact that the first battery 10 needs to be applied to the motor 12 that outputs a large torque capable of generating power of the vehicle.

In a mild hybrid vehicle recently researched and developed, the first battery 10 may have a voltage of about 50 V, and in a typical hybrid or electric vehicle, the first battery 10 may have a voltage of several hundred volts. When a current is injected into the motor 12 and the motor 12 generates a rotational force and provides the rotational force to the wheels of the vehicle, the inverter 11 may be configured to convert DC power stored in the first battery 10 into AC power corresponding to the number of phases of the motor 12 and supply the AC power to the motor 12. The inverter 11 may include a plurality of switching elements, and may be configured to generate a current that corresponds to a torque requested by a driver through a pulse width modulation control of the switching elements and provide the generated current to the motor 12.

Meanwhile, when braking of the vehicle is required, the inverter 11 may be configured to operate the motor 12 as a generator to convert the current generated by the rotation of the motor 12 into the DC power and supply the DC power to the first battery 10 or the second battery 14, thereby making it possible to generate a regenerative braking torque. In particular, the pulse width modulation control of the switching elements inside the inverter 11 may be performed, and particularly, the inverter 11 may be operated to output a voltage of a magnitude sufficient to charge the first battery 10 to the first battery 10 side. Input and output terminals of the first battery 10 side of the inverter 11 may be connected to the DC link terminal $DC_{LINK}$ connected to the first battery 10 to form the DC link voltage Vdc.

Various techniques known in the art may be employed for a detailed circuit structure of the inverter 11 or a control technique of the switching element for generating the injection current of the motor or generating the regenerative braking torque.

The DC converter 13 disposed between the first battery 10 and the second battery 14 may be configured to down-convert the voltage of the first battery 10 and supply the down-converted voltage to the second battery 14. The DC converter 13 may be also referred to as a low voltage DC-DC converter (LDC) configured to convert a high voltage into a voltage of a second battery 14 of a low voltage. The DC converter 13 may be implemented by applying various DC converter topologies known in the art. An input terminal of the DC converter 13 may be connected to the DC link terminal $DC_{LINK}$ and an output terminal thereof may be connected to the second battery 14.

The second battery 14, which is an energy storage apparatus configured to supply power to various electric loads applied to the vehicle, may have a voltage that is less than the voltage of the first battery 10. For example, the second battery 14 may be a battery having a voltage of about 12 V to 15 V. In an electric vehicle or a general hybrid vehicle in which the first battery 10 having a large capacity and high voltage is employed, a capacity of the second battery 14 is relatively small, and therefore, an influence of the second battery 14 may be insignificant when considering the regenerative braking torque. However, in the first battery 10 of a mild hybrid vehicle having a relatively low voltage (e.g., about 50 V), a capacity difference from the second battery 14 is relatively small, and therefore, the second battery 14 may have a relatively substantial influence when calculating a possible regenerative braking torque according to the capacity of the battery.

Therefore, according to various exemplary embodiments of the present disclosure, when calculating an allowable regenerative braking torque when braking of the vehicle is required, the amount of chargeable energy of the first battery 10 and the second battery 14 is all considered, and a regenerative braking energy due to the regenerative braking torque actually generated by the motor 12 may be charged to both the first battery 10 and the second battery 14.

Particularly, the controller 100 may be configured to receive information corresponding to a depressed amount of a brake pedal by the driver from the brake pedal 15, that is, information regarding a braking demand amount of the driver (e.g., amount of force exerted onto the brake pedal), and may thus be configured to determine the regenerative braking torque based on chargeable capacities of the first battery 10 and the second battery 14. The controller 100 may be configured to operate the inverter 11 so that the motor 12 may generate the determined regenerative braking torque when the regenerative braking torque is determined to cause the current due to the regenerative braking torque to flow into the DC link terminal $DC_{LINK}$, and charge both the first battery 10 and the second battery 14 by supplying a current corresponding to the regenerative braking energy to the first battery 10 and the second battery 14 by operating the low voltage DC-DC converter 13.

According to an exemplary embodiment of the present disclosure, the controller 100 may be implemented through various components of the vehicle, particularly, a non-volatile memory configured to store an algorithm configured to perform a control for determining a braking torque of the vehicle or data related to software instructions reproducing such an algorithm, and a processor configured to perform operations described below using the data stored in the memory. Particularly, the memory and the processor may be implemented as separate chips or may be implemented as a single chip integrated with each other. The processor may be implemented in the form of including one or more processors.

Figure 2:
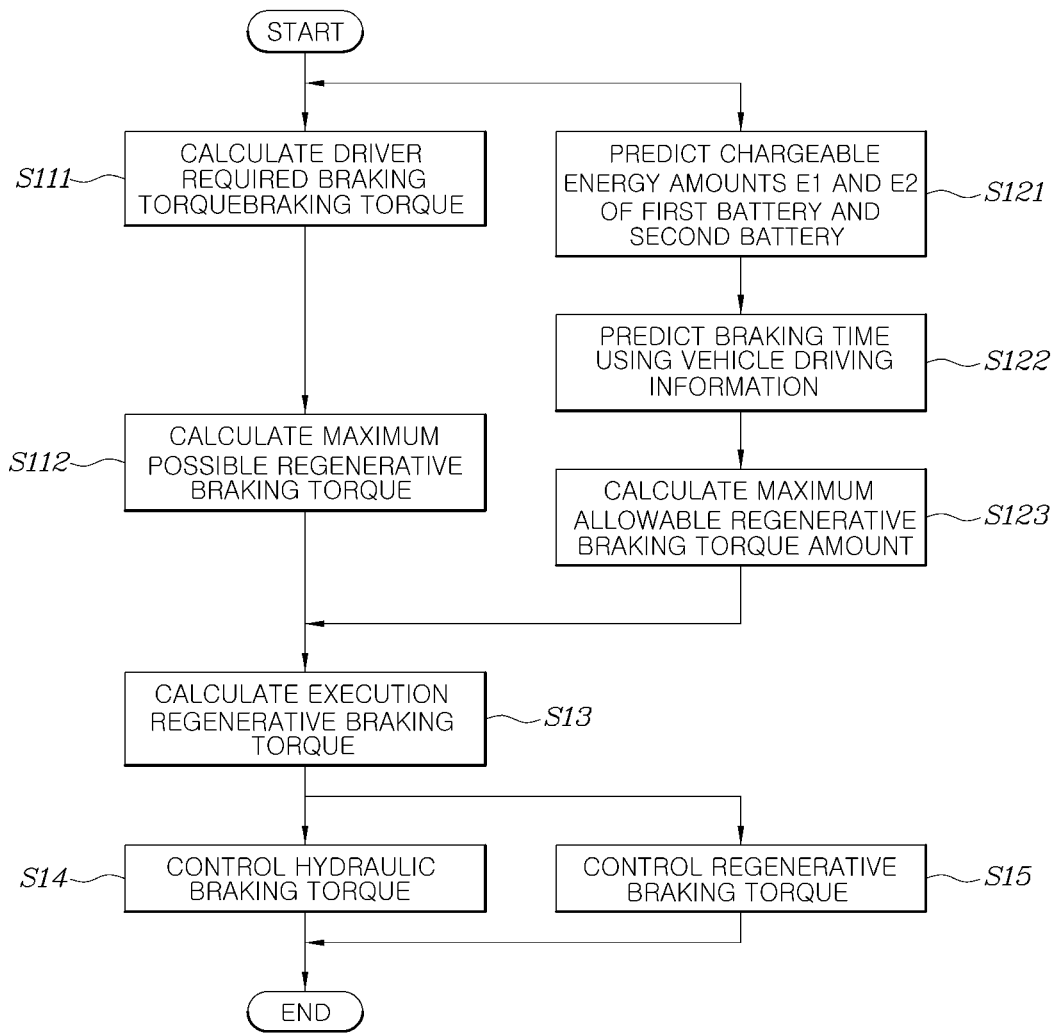
FIG. 2 is a flowchart illustrating a braking control method for a vehicle according to an exemplary embodiment of the present disclosure.

An operation and an effect of the braking control system for a vehicle having the configuration as described above will be more clearly understood from a description of a braking control method for a vehicle according to an exemplary embodiment of the present disclosure described later. FIG. 2 is a flowchart illustrating a braking control method for a vehicle according to an exemplary embodiment of the present disclosure.

Referring to FIG. 2, when the braking of the vehicle is started by the driver engaging the brake pedal 15, the controller 100 may be configured to receive information regarding a depressed amount of the brake pedal 15 and calculate a braking torque required by the driver. The required braking torque according to the depressed amount of the brake pedal 15 may be calculated by applying various technologies known in the art. For example, the required braking torque may be calculated using a data map in which a relationship between a preset brake pedal depressed amount and the required braking torque is stored (S111).

The controller 100 may then be configured to calculate the maximum regenerative braking torque, which is the maximum value of a regenerative braking torque which may be provided by the motor 12, based on the calculated required braking torque (S112). The maximum regenerative braking torque may be determined based on a rotational speed of the motor 12 and the magnitude of the required braking torque. According to a specific technique for determining the maximum regenerative braking torque, the maximum possible regenerative braking torque may be calculated based on the speed (RPM) and temperature of the motor.

On the other hand, when the braking of the vehicle is started by the driver engaging the brake pedal 15, the controller 100 may be configured to calculate the amount of energy E1 and E2 that may be charged in the respective batteries based on stages of charge of the first battery 10 and the second battery 14 (S121). The calculation in step S121 may be performed based on the state of charge (SOC) of each battery 10, 14, monitored by a battery management system or a hybrid controller provided within the vehicle, and the maximum capacity corresponding to the specification of each battery 10, 14. The controller may then be configured to predict a braking time based on the calculated required braking torque and driving information (e.g., vehicle speed or inclination) of a vehicle (S122). The prediction of the braking time may be performed by applying various techniques known in the art.

Further, the controller 100 may be configured to calculate the maximum allowable regenerative braking torque, which is the maximum value of an allowable regenerative braking torque, based on the chargeable energy amounts calculated in step S121 and the braking prediction time calculated in step S122 (S123). For example, in step S123, the controller 100 may be configured to determine the magnitude of the regenerative braking torque on the assumption that the amount of energy capable of charging both the first battery 10 and the second battery 14 is provided by the regenerative braking torque during the braking prediction time. In other words, the regenerative braking torque capable of providing the regenerative braking energy capable of charging both the batteries 10 and 14 during the braking prediction time may be determined as the maximum allowable regenerative braking torque.

The controller 100 may then be configured to determine a torque having a smaller value among the maximum possible regenerative braking torque calculated in step S112 and the maximum allowable regenerative braking torque calculated in step S123 as an execution regenerative braking torque which is actually applied to the vehicle (S13). The controller 100 may be configured to operate the hydraulic brake 16 to provide the braking torque having the magnitude excluding the execution regenerative braking torque from the driver required braking torque (S14), and operate the inverter 11 to determine the execution regenerative braking torque from the motor 12 (S15). In step S15, the controller 100 may be configured to charge the first battery 10 and the second battery 14 by supplying the regenerative braking energy generated by the regenerative braking torque to the first battery 10 and the second battery 14 in various manners.

Figure 3:
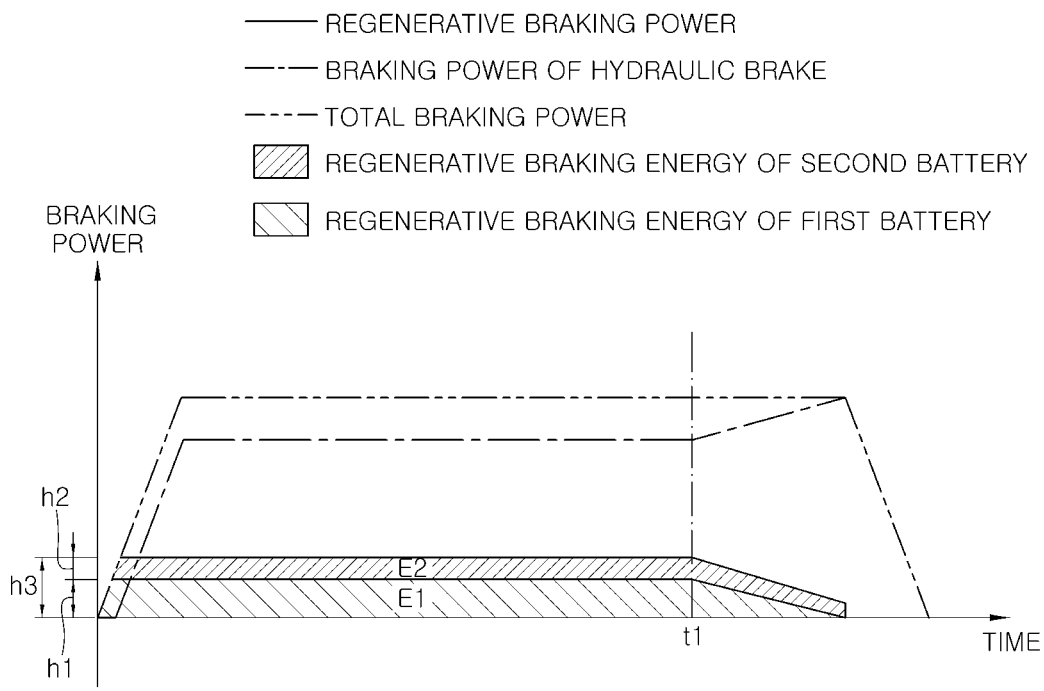
FIGS. 3 to 5 are graphs describing various regenerative braking application schemes applied to a braking control system and method for a vehicle according to an exemplary embodiment of the present disclosure.
Figure 4:
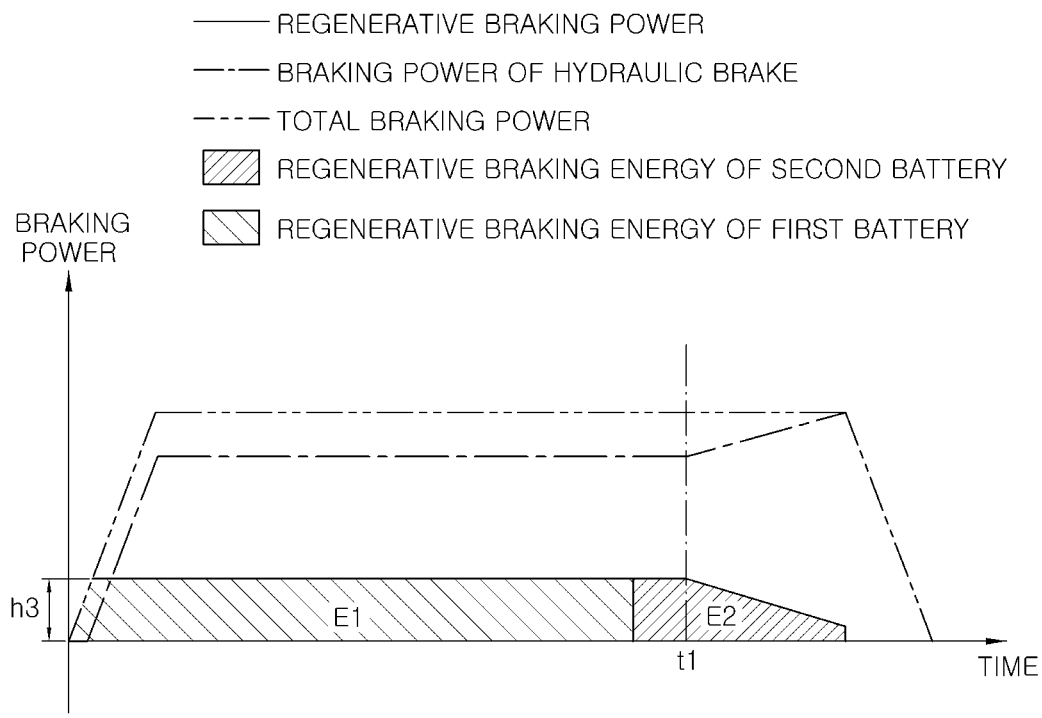
Figure 5:
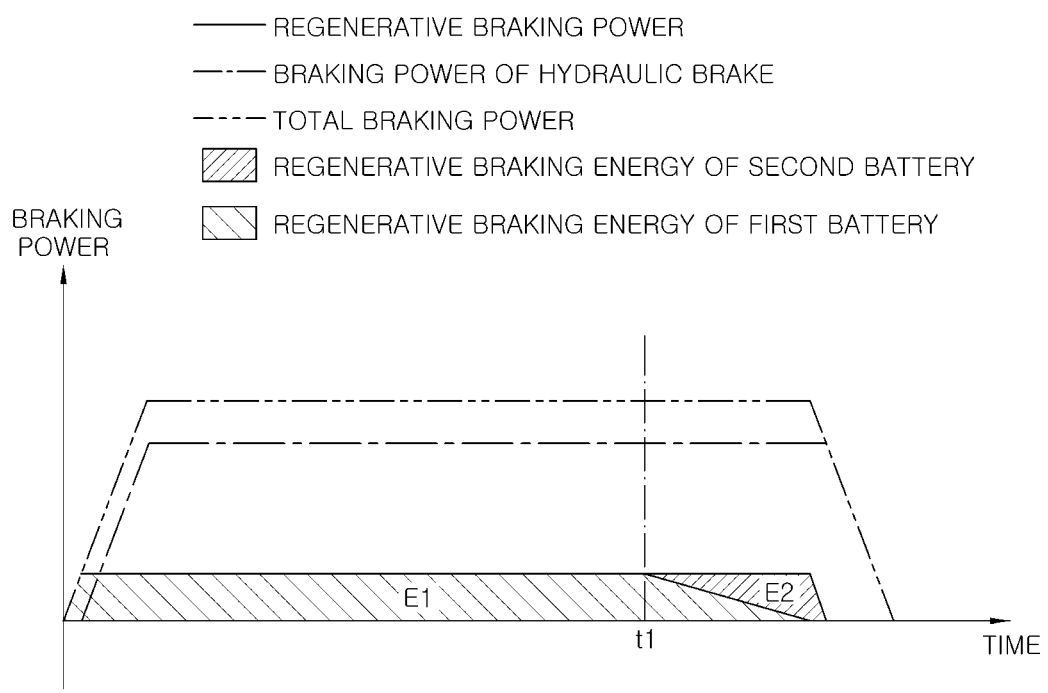

FIGS. 3 to 5 are graphs describing various regenerative braking application schemes applied to a braking control system and method for a vehicle according to an exemplary embodiment of the present disclosure. First, referring to FIG. 3, the controller 100 may be configured to simultaneously charge the first battery 10 and the second battery 14 using the regenerative braking energy. In particular, the controller 100 may be configured to operate the switching elements of the inverter 11 to adjust the output voltage on the DC link terminal $DC_{LINK}$ side of the inverter 11 to become greater than the voltage of the first battery 10 to charge the first battery 10. At the same time, the controller 100 may be configured to operate the DC converter 13 to adjust the output of the DC converter 13 to become greater than the voltage of the second battery 14 to charge the second battery 14. The controller 100 may be configured to operate the hydraulic brake 16 to output the torque excluding the regenerative braking torque from the required braking torque.

Referring to FIG. 4, the controller 100 may be configured to first charge the first battery 10, which is a battery for driving the motor 12 having a greater influence on the driving of the vehicle, with the regenerative braking torque, and charge the second battery 14 with the regenerative braking energy by the regenerative braking torque after the charging of the first battery 10 is completed. In particular, the controller 100 may be configured to operate the switching elements of the inverter 11 to adjust the output voltage on the DC link terminal $DC_{LINK}$ side of the inverter 11 to become greater than the voltage of the first battery 10 to charge the first battery 10 and operate the DC converter 13 to output a voltage less than the voltage of the second battery 14, but may be configured to temporarily stop an operation of the DC converter 13. When the state of charge of the first battery 10 becomes a fully charged state, the controller 100 may be configured to operate the switching elements of the inverter 11 to output a voltage less than the voltage of the first battery 10, and operate the DC converter 13 to adjust the output voltage of the DC converter 13 to become greater than the voltage of the second battery 14.

Referring to FIG. 5, when the regenerative braking torque decreases while the first battery 10, which is a battery for driving the motor 12 having a greater influence on the driving of the vehicle, is first charged with the regenerative braking torque, and the regenerative braking energy decreases, the controller 100 may be configured to charge the second battery 14 with the regenerative braking energy by the regenerative braking torque. Through such a control, a problem that the regenerative braking torque decreases and the hydraulic braking torque of the hydraulic brake needs to be additionally increased may be solved. In other words, since the regenerative braking torque may be increased by storing the regenerative braking energy through the second battery 14 even if there is no auxiliary apparatus provided for adding the hydraulic braking torque of the hydraulic brake, it may be possible to remove an additional apparatus provided in the hydraulic brake.

In the case of the control of the regenerative braking torque illustrated in FIG. 5, the controller 100 may be configured to operate the switching elements of the inverter 11 to adjust the output voltage on the DC link terminal $DC_{LINK}$ side of the inverter 11 to become greater than the voltage of the first battery 10 to charge the first battery 10 and operate the DC converter 13 to output a voltage that is less than the voltage of the second battery 14, but may be configured to temporarily stop an operation of the DC converter 13. When the magnitude of the charge current provided to the first battery 10 is decreased by a predetermined level or more, the controller 100 may be configured to operate the second battery 14 to store the regenerative braking energy by operating the DC converter 13 to adjust the output of the DC converter 13 to become the voltage of the second battery 14.

According to the braking control system and method for a vehicle, the regenerative braking torque may be set to a greater value by allowing the regenerative braking energy to be stored using both the main battery and the auxiliary battery provided in the eco-friendly vehicle. In particular, according to the braking control system and method for a vehicle, it may be possible to maximally secure the charging of the main battery by charging the auxiliary battery after the charging of the main battery is completed using the regenerative braking energy generated by the regenerative braking torque, thereby improving the fuel efficiency of the vehicle.

In addition, according to the braking control system and method for a vehicle, it is not necessary to increase the hydraulic braking torque by the hydraulic brakes by simultaneously charging the auxiliary battery to compensate for the reduction of the regenerative braking torque when the regenerative braking torque decrease during charging of the main battery, thereby removing the additional apparatus required for increasing the hydraulic braking torque.

The effects obtainable in the present disclosure are not limited to the effects mentioned above, and other effects that are not mentioned may be obviously understood by those skilled in the art to which the present disclosure pertains from the following description.

Although the present disclosure has been illustrated and described with respect to specific exemplary embodiments, it will be obvious to those skilled in the art that the present disclosure may be variously modified and altered without departing from the spirit and scope of the present disclosure as defined by the following claims.

What is claimed is:

1. A braking control system for a vehicle, comprising:
   a motor providing rotational force to wheels of the vehicle;
   a first battery configured to store electric energy for driving the motor;
   an inverter connected to the first battery via a direct current (DC) link terminal and configured to perform a bidirectional power conversion between the DC link terminal and the motor;
   a direct current (DC) converter connected to the DC link terminal to down-convert a voltage of the DC link terminal and output the down-converted voltage;
   a second battery supplied with the voltage converted by the DC converter and having a voltage lower than that of the first battery; and
   a controller configured to operate the inverter and the DC converter to charge regenerative braking energy generated from the motor during braking of the vehicle in the first battery and the second battery,
   wherein the controller is further configured to:
   calculate a chargeable energy amount of both the first battery and the second battery based on a state of charge of the first battery and the second battery during braking of the vehicle;
   determine an execution regenerative braking torque which is output from the motor based on the chargeable energy amount; and
   operate the inverter for the motor to output the execution regenerative braking torque,
   wherein when the controller operates the inverter to output the execution regenerative braking torque, the controller is configured to:
   operate the DC convener to output a voltage lower than a voltage of the second battery or stop an operation of the DC converter while operating the inverter to adjust an output voltage of the DC link terminal side of the inverter to become greater than a voltage of the first voltage; and
   operate the DC converter to output a voltage greater than the voltage of the second battery while operating the inverter to output a voltage greater than the voltage of the first battery when the magnitude of a current provided to the first battery is decreased by a predetermined level or more.

2. The braking control system for the vehicle of claim 1, wherein the controller is configured to:
   calculate a required braking torque based on a engagement amount of a brake pedal of the vehicle;
   calculate the maximum possible regenerative braking torque, which is the maximum value of the regenerative braking torque which is provided to the motor, based on the required braking torque;
   predict a braking time based on the required braking torque and driving information of the vehicle;
   calculate the maximum allowable regenerative braking torque, which is the maximum value of the allowable regenerative braking torque, based on the chargeable energy amount and the predicted braking time; and
   determine a smaller torque of the maximum possible regenerative braking torque and the maximum allowable regenerative braking torque as the execution regenerative braking torque.

3. The braking control system for the vehicle of claim 1, wherein when the controller operates the inverter to output the execution regenerative braking torque, the controller is configured to operate the inverter to adjust an output voltage of the DC link terminal side of the inverter to become greater than a voltage of the first battery, and simultaneously operate the DC converter to adjust an output of the DC converter to become greater than a voltage of the second battery.

4. The braking control system for the vehicle of claim 1, wherein when the controller operates the inverter to output the execution regenerative braking torque, the controller is configured to:
   operate the DC converter to output a voltage lower than a voltage of the second battery or stop an operation of the DC converter while operating the inverter to adjust an output voltage of the DC link terminal side of the inverter to become greater than a voltage of the first battery; and
   operate the DC converter to output a voltage greater than the voltage of the second battery while operating the inverter to output a voltage lower than the voltage of the first battery when the state of charge of the first battery becomes a fully charged state.

5. A braking control method for the vehicle using the braking control system for a vehicle of claim 1, comprising:
   calculating, by a controller, a required braking torque when a braking of the vehicle is started;
   calculating, by the controller, a chargeable energy amount of both the first battery and the second battery based on a state of charge of the first battery and the second battery; and
   determining, by the controller, an execution regenerative braking torque which is output from the motor based on the chargeable energy amount and operating the inverter to generate the execution regenerative braking torque.

6. The braking control method for the vehicle of claim 5, further comprising:
   calculating, by the controller, the maximum possible regenerative braking torque, which is the maximum value of a regenerative braking torque which is provided to the motor, based on the required braking torque;
   predicting, by the controller, a braking time based on the required braking torque and driving information of the vehicle; and
   calculating, by the controller, the maximum allowable regenerative braking torque, which is the maximum value of an allowable regenerative braking torque, based on the chargeable energy amount and the predicted braking time,
   wherein in the operating of the inverter, a smaller torque of the maximum possible regenerative braking torque and the maximum allowable regenerative braking torque is determined as the execution regenerative braking torque and the inverter is operated to generate the execution regenerative braking torque.

7. The braking control method for the vehicle of claim 5, wherein in the operating of the inverter, the first battery and the second battery are simultaneously charged using the regenerative braking energy generated by the execution regenerative braking torque.

8. The braking control method for the vehicle of claim 7, wherein in the operating of the inverter, the inverter is operating to adjust an output voltage of the DC link terminal side of the inverter to become greater than a voltage of the first battery, and the DC converter is operated to adjust an output of the DC converter to become greater than a voltage of the second battery.

9. The braking control method for the vehicle of claim 5, wherein in the operating of the inverter, the second battery is charged after the first battery is fully charged using the regenerative braking energy generated by the execution regenerative braking torque.

10. The braking control method for the vehicle of claim 9, wherein operating the inverter includes:
    operating, by the controller, the DC converter to output a voltage lower than a voltage of the second battery or stopping an operation of the DC converter while operating inverter to adjust an output voltage of the DC link terminal side of the inverter to become greater than a voltage of the first battery; and
    operating, by the controller, the DC converter to output a voltage greater than the voltage of the second battery while operating the inverter to output a voltage lower than the voltage of the first battery when the state of charge of the first battery becomes a fully charged state.

11. The braking control method for the vehicle of claim 5, wherein in the operating of the inverter, the first battery is first charged using the regenerative braking energy generated by the execution regenerative braking torque, and the first battery and the second battery are simultaneously charged using the regenerative braking energy generated by the execution regenerative braking torque when the regenerative braking energy provided to the first battery is decreased during charging of the first battery.

12. The braking control method for the vehicle of claim 11, wherein operating the inverter includes:
    operating, by the controller, the DC converter to output a voltage lower than a voltage of the second battery or stopping an operation of the DC converter while operating the inverter to adjust an output voltage of the DC link terminal side of the inverter to become greater than a voltage of the first voltage; and
    operating, by the controller, the DC converter to output a voltage greater than the voltage of the second battery while operating the inverter to output a voltage greater than the voltage of the first battery when the magnitude of a current provided to the first battery is decreased by a predetermined level or more.

\* \* \* \* \*